United States Patent [19]
Bacon et al.

[11] Patent Number: 5,897,066
[45] Date of Patent: Apr. 27, 1999

[54] CLAW DRUM FOR SHREDDING USED CARPET

[75] Inventors: Forrest C. Bacon, 2175 Surrey Trail, Conyers, Ga. 30208; Wendell R. Holland; Lial H. Holland, both of Doniphan, Mo.

[73] Assignee: Forrest C. Bacon, Conyers, Ga.

[21] Appl. No.: 08/834,951

[22] Filed: Apr. 7, 1997

[51] Int. Cl.⁶ ..................................................... B02C 18/16
[52] U.S. Cl. .......................... 241/160; 241/295; 241/300
[58] Field of Search ................................ 241/3, 300, 197, 241/294, 295, 242, 160; 19/97

[56] References Cited

U.S. PATENT DOCUMENTS

| | | | |
|---|---|---|---|
| 10,803 | 4/1854 | Hurd .......................................... | 19/97 |
| 815,395 | 3/1906 | Williams ..................................... | 19/97 |
| 2,014,673 | 9/1935 | Setzer ......................................... | 19/97 |
| 4,797,977 | 1/1989 | Napoleon et al. .......................... | 19/97 |
| 5,230,473 | 7/1993 | Hagguist et al. ............................ | 241/3 |

Primary Examiner—Mark Rosenbaum
Attorney, Agent, or Firm—Patrick D. Kelly

[57] ABSTRACT

A rotating claw drum for shredding discarded material (such as used carpet) is created from flat circular plates that are stacked tightly together on a driveshaft or drum, to create an impermeable drum face that prevents particulates from entering and fouling the internal mechanisms. Each flat plate is provided with at least one claw-holding slot in its outer rim; 6 to 12 slots preferably should be provided in each plate. Locking means (such as a locking bar that will pass through aligned locking notches in the slots and claws) will lock the claws in place while the drum is in use. After the drum has been stopped, a locking bar can be removed, to release a damaged claw from its slot so it can be replaced, without having to disturb any other claws. Each claw-holding slot can also provide a remover notch, which will allow a remover bar with a wedged end to be hammered through a set of aligned remover notches, to dislodge the claws in a row, enabling removal of a damaged claw even if the claw is firmly stuck in its slot. This claw drum can be used in a three-cylinder shredding device that provides good results when used to shred discarded carpet.

16 Claims, 3 Drawing Sheets

FIG.6

CLAW DRUM FOR SHREDDING USED CARPET

BACKGROUND OF THE INVENTION

This invention relates to machinery and methods for recycling used carpets. Such recycling is useful for reclaiming and reusing valuable materials (such as nylon and polypropylene), and for reducing the quantity of solid waste that must be disposed of in landfills.

Today, most carpets that must be discarded (either because they have become badly worn after use, or because they do not meet appropriate quality standards after manufacture) are buried in landfills, or burned in incinerators. These are not ideal methods of disposal, and it is preferable to recycle them in some manner which reuses at least some of their materials.

Most carpets made today contain pile fibers made of nylon, which are woven through a primary backing layer, then glued to a secondary backing layer. Polypropylene is used most commonly to make both backing layers. Latex mixed with calcium carbonate is used most commonly as the binder/filler material that glues the nylon piles to the polypropylene backing layers. Polypropylene and latex are relatively cheap and strong, which is why they are used so widely in carpet manufacture; by contrast, nylon is substantially more expensive, and it has a substantially higher value when recycled. Latex also has the advantage of being flexible and yielding at room temperatures, so it will not split, crack, or become brittle when carpet is rolled up and then laid flat, during storage, handling, and laying.

Several types of carpet recycling processes have been developed, which use a variety of different approaches that can generally be grouped into three categories. In one category, a grinding or shredding machine chews up an entire segment of carpet, leaving the nylon mixed together with the polypropylene and latex. The composite mixture that results is used as a relatively low-grade plastic, for purposes such as molded park benches.

A second type of system tries to break apart and loosen the latex binder that holds nylon piles to backing layers; see U.S. Pat. No. 5,230,473, by Hagguist and Hume 1993. This allows the nylon pile fibers to be pulled out of the backing layer, using rollers that contain various types of small claw-type fingers that engage and pull at the nylon pile fibers while the backing layer (which remains intact) continues to travel upon a flat conveyer system. This type of system generates reclaimed nylon that is substantially purer and more valuable; however, it is substantially more expensive to operate, and requires certain types of liquid solvents to loosen and remove the latex. It also requires removal of the liquid solvents from the reclaimed nylon.

A third type of system cuts carpet segments into relatively small chunks, which are then grinded or pulverized into tiny fragments. These fragments are then passed through centrifugal separators, to try to separate most of the polypropylene, latex, and calcium carbonate particles, which are relatively dense, from the nylon pile material, which is less dense.

None of these systems have reached a point where they are entirely satisfactory, as evidenced by the fact that carpet recycling is still in a stage of struggling infancy. There are very few successful and profitable operations anywhere in the U.S., despite the fact that more than 4 billion pounds of carpet are discarded every year in America. Presently, the very large majority of that discarded carpet goes into landfills.

Currently, claw drums that are used in certain types of carpet shredding operations (in the first category of recycling systems, listed above) have a design which can be referred to as an "open culinder". One such device is shown in U.S. Pat. No. 3,780,399 (Morel, 1973, assigned to Laroche Machines, of Cours, France; also illustrated in the Laroche sales brochure for the "Horizontal heavy opener, Picker type"). This drum (and various other types of carding and combing rollers, as described below) is mainly used in "fiber opening" operations, in which balls, clumps, or mats of cotton or other fibers must be opened up and pulled apart, so that the fibers can be turned into threads, for weaving or other use.

The Laroche type of "open drum" comprises a series of claw-tooth mounting bars that are spaced apart from each other, in a cylindrical arrangement. The claws are emplaced in these bars by sliding a series of claw-tooth bases into an accommodating groove in a mounting bar; for example, if the claw-tooth bases are T-shaped, the accommodating grooves will be rectangular. Such systems, with rows of teeth mounted in bars, are illustrated in U.S. Pat. Nos. 3,445,895 (Barbod 1969) and 4,797,977 (Napoleon et al, 1989).

There are at least two major problems with open drums, when used for carpet shredding. First, if a single claw-tooth in a row pf claws gets broken (or unacceptably worn and dull) and must be replaced, it usually is necessary to remove all of the claws on one side of that claw, by sliding all of them out of the bar, before the broken or worn tooth can be accessed and removed. This can be a difficult, cumbersome, and time-consuming operation, particularly in view of the second problem with such systems.

The second problem with open drums in carpet shredding operations is that they are working in an environment that is constantly being surrounded by extremely high levels of airborne particulates and fibers. As a segment of old, dirty carpet is shredded by a rotating claw drum, it rips apart (1) the semi-brittle latex binder (with calcium carbonate) that was used to glue the nylon pile to the polypropylene backing layers; (2) the relatively thick and stiff glue-covered strands of the polypropylene backing layers; and (3) the nylon pile material. All of these components, plus any dust and dirt that was pushed into the carpet during years of use, are being ripped apart at high speed.

To try to minimize the dangers of such particles in the open air (and to minimize noise levels as well), claw drums that are used to shred carpet are always operated inside a surrounding hood or cowl, made of sheet metal. Air is constantly being sucked out of these hoods by a vacuum system, which carries the air-borne particulates to a filter system which collects them, so they can be disposed of as solid waste rather, than discharging them into ambient air which people are breathing.

Despite the use of such vacuuming systems, a very high level of airborne dust, particulates, and fibers constantly surrounds a claw drum whenever it is actively shredding carpet. This mixture of dust, particulates, and fibers works its way into any and all cavities and openings in and around the teeth and the mounting bars of the claw drum. This is undesirable, for various reasons; in general, particulates and fibers can jam up bearings, joints, or other operating mechanisms, and can also cause abrasion which reduces the operating life of the various components. To avoid such problems, a "solid-face" claw-tooth drum would be preferable, in which the claws extend outwardly from a solid and impermeable cylindrical face that does not allow any dust, particulates, or fibers to work their way into the internal mechanisms of the cylinder while it is being used to shred carpet.

Other types of cylinders, with long narrow tines that protrude from a solid cylindrical face, have been developed for combing operations, where the operating requirements and goals are substantially different than for carpet shredding. Such cylinders are described in, for example, British patent 2,035,402 A (Kanai, published in June 1980). FIG. 1 in that patent purports to show a conventional (prior art) combing device, in which various "needles" are inserted into flat "needle plates". A number of such needle plates, with needles inserted, are then stacked together to form a rotating combing device. That British patent criticized the previous methods of constructing such plates, and disclosed a purportedly superior design that used angled "7"-shaped insertion slots for the needles. It should be noted that in both the conventional design and in the newly-patented design shown in the British patent, a single needle, if damaged, could not be removed from its holding plate, due to the presence of a protrusion on the side of the needle. Accordingly, a different removal procedure for dealing with a damaged needle is described in lines 30–43 of page 1.

A somewhat similar arrangement, apparently for a conventional prior art combing device, was illustrated in FIG. 1 of Japanese patent 60-75618. As in the British patent, a damaged needle could not be removed by itself, without somehow opening up or removing the plate and cutting through the "sash" bar that was inserted through an entire row of needles. That patent purported to show an improved design, in which individual needles apparently could be inserted and removed due to a different design; however, in that purportedly improved design, the needles themselves did not protrude out from a solid cylindrical face. Instead, each needle was provided with a pair of flanking "shoulder" surfaces which, if properly lined up together with the shoulders of other such needles, would generate a relatively smooth cylindrical surface at the base of the protruding the needles. A visual examination of the improved design in FIG. 2 of Japanese patent 60-75618 suggests that that design, which was intended as a combing device, would not be nearly strong enough and durable enough for reliable use in shredding carpet, which presents an entirely different set of challenges and obstacles that must be overcome.

As noted above, these combing systems have never been adapted to other machinery for shredding carpet segments.

One object of the subject invention is to disclose an improved heavy-duty claw-tooth drum which can rip apart and shred segments of discarded carpet into a combination of (1) chunks or strands of polypropylene backing material, and (2) strands of nylon pile material, while eliminating any processing steps that might otherwise be required to remove intact segments of polypropylene backing material from the nylon pile material.

Another object of this invention is to disclose an improved processing system for recycling segments of discarded carpet, in which an improved claw-tooth drum interacts with other processing devices, to rip apart segments of discarded carpet, and subsequently to separate particles and strands of polypropylene backing material from nylon pile material, while eliminating any processing steps that would otherwise be required to remove intact segments of polypropylene backing material from the nylon pile material.

Another object of this invention is to disclose an improved claw-tooth drum which has a solid, closed, impermeable cylindrical face, through which any desired number of claws protrude. By providing a solid closed face (rather than an open-faced cylinder comprising spaced bars for mounting the claws), the improved claw drum resists fouling and clogging of the cylinder and various internal mechanisms due to accumulation inside the cylinder of polypropylene and nylon fragments, latex particles, and dust, which are generated in copious quantities whenever carpet segments are ripped apart by claw drums rotating at fairly high speeds.

Another object of this invention is to disclose an improved claw drum in which a worn or broken claw, at any location on the surface of the drum, can be easily replaced, by itself, without having to move or adjust any other claws.

These and other objects of the invention will become more apparent through the following summary, drawings, and description of the preferred embodiments.

SUMMARY OF THE INVENTION

An improved type of rotating claw drum for shredding discarded carpet segments provides a closed and impermeable cylindrical face, through which any desired number of claws (also called teeth) protrude. This drum is created from flat plates that have been cut or machined to close tolerances (such as by laser cutting). These flat plates are mounted (stacked) on a rotatable driveshaft or drum, in a tightly-packed arrangement that does not leave any spaces or gaps between the plates.

Each circular plate is provided with at least one specially designed slot in its outer periphery. Each slot will securely hold the base of a single claw. Preferably, a substantial number of claw slots (such as 6 to 12) should be spaced around the periphery of each plate. The main portion of this slot will be essentially rectangular, and may have a mild slope to facilitate insertion or removal of the base of a claw.

The plate or slot must provide locking means to firmly secure a claw in its slot, such as a side-positioned locking notch which will align with a similar locking notch on the side of a claw that has been properly seated. When all of the plates and claws have been properly stacked on a driveshaft, the locking notches in all of the plates will align with each other, to create a tunnel through the plates. This tunnel will accommodate a locking bar, which will lock the claws in place in their slots.

Locking bars will be spaced in a circular manner around each plate, and can be provided with threads or other attachment means at both ends. This will allow each locking bar to be tightly secured to the drum at both ends, by means such as a threaded nut at each end of the shaft. This will lock all of the claws in place while the drum is in use. It will also allow any locking bar to be disengaged and pulled out of its tunnel, to release a damaged claw from its slot so it can be replaced.

Each claw slot also should provide, at its bottom end, a remover notch. This will allow a remover bar with a wedged end to be tapped, hammered, or otherwise forced through a series of aligned remover notches in a drum, to dislodge the claws in a row. This will enable removal of a damaged or worn claw, even if the claw has become firmly stuck and jammed in its slot.

This claw drum can be used in a 3-cylinder carpet shredding device as disclosed herein. It is designed for long-term heavy-duty use in an extraordinarily abrasive operation, in an extremely dirty, dusty, and foul operating environment. It can reduce the expense of carpet recycling, and can help reduce or eliminate a major solid waste problem which currently causes billions of pounds of potentially useful polymer feedstocks to be dumped in landfills each year.

DESCRIPTION OF THE PREFERRED EMBODIMENTS

Figures 1, 2, 3:
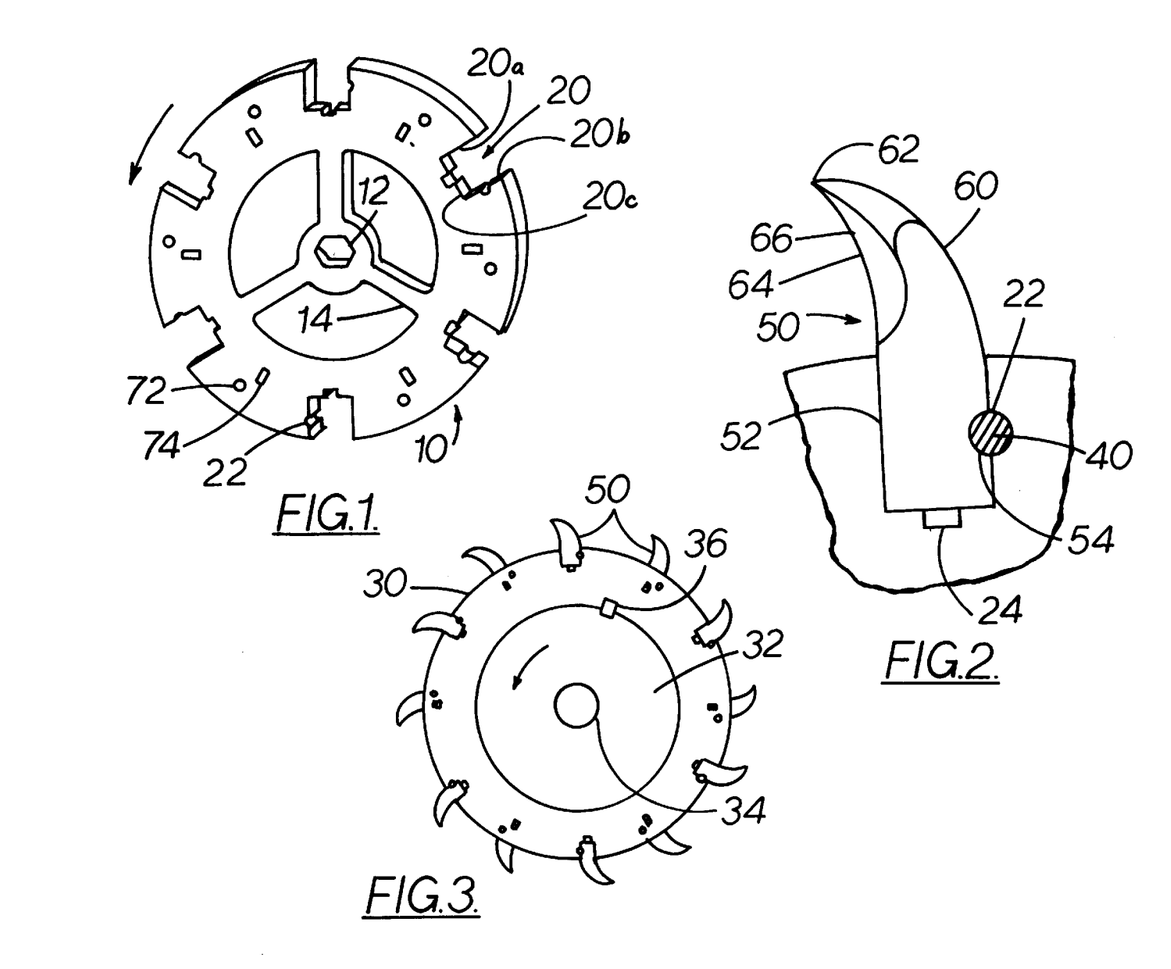
FIG. 1 is a side view of a single laser-cut flat plate for a claw-tooth drum, with slots for inserting 6 claws around its periphery, with a hexagonal center hole.
FIG. 2 is a side view of a claw slot with a claw inserted into it, held in place by a locking shaft.
FIG. 3 is a side view of a washer-type drum plate, mounted on a drum rather than a drive shaft.

Referring to the drawings more particularly by reference numbers, callout number 10 in FIG. 1 refers to a flat claw-holding plate with a center hole 12, and a generally circular outer rim which has a plurality of slots 20 spaced apart from each other. A plurality of such claw-holding plates 10 will be mounted on a rotatable driveshaft, to generate a rotating claw drum 122 (shown in FIG. 6) that will be used to rip apart segments of discarded carpet, so that the nylon and polypropylene components can be recycled.

As shown in FIG. 2, each slot 20 is designed to hold a single claw 50. The principle dimensions of slot 20 are determined by slot side walls 20a and 20b, and by slot bottom wall 20c. The direction of rotation of this plate is indicated by an arrow in FIG. 1, and in accord with that arrow, slot side wall 20a can be regarded as a "leading" wall, while slot side wall 20b can be regarded as a "trailing" wall.

Side slot walls 20a and 20b can be completely parallel if desired, to accommodate rectangular claw bases. Alternately, slot walls 20a and 20b can be slightly wedged with respect to each other, if desired, preferably with a wedge angle of only about 2 or 3 degrees at most, to reduce the likelihood that a claw base will become badly jammed in a slot.

Each slot 20 in plate 10 is provided with a side-positioned locking notch 22, which can be positioned either in the leading side wall 20a, or in the trailing side wall 20b. It is believed that locking notch 22 preferably should be positioned in trailing wall 20b, since a locking bar positioned in the trailing wall will be subject to compression when a rotating claw drum shreds a piece of discarded carpet. By contrast, as the claw tip 62 shown in FIG. 2 is pushed hard to the right, by the resistance of a carpet segment being shredded, that level of compression will not be imposed on the leading side wall 20a. Therefore, a locking bar positioned in leading side wall 20a might not provide as much security against any possible motion by the claw.

Figures 4, 5:
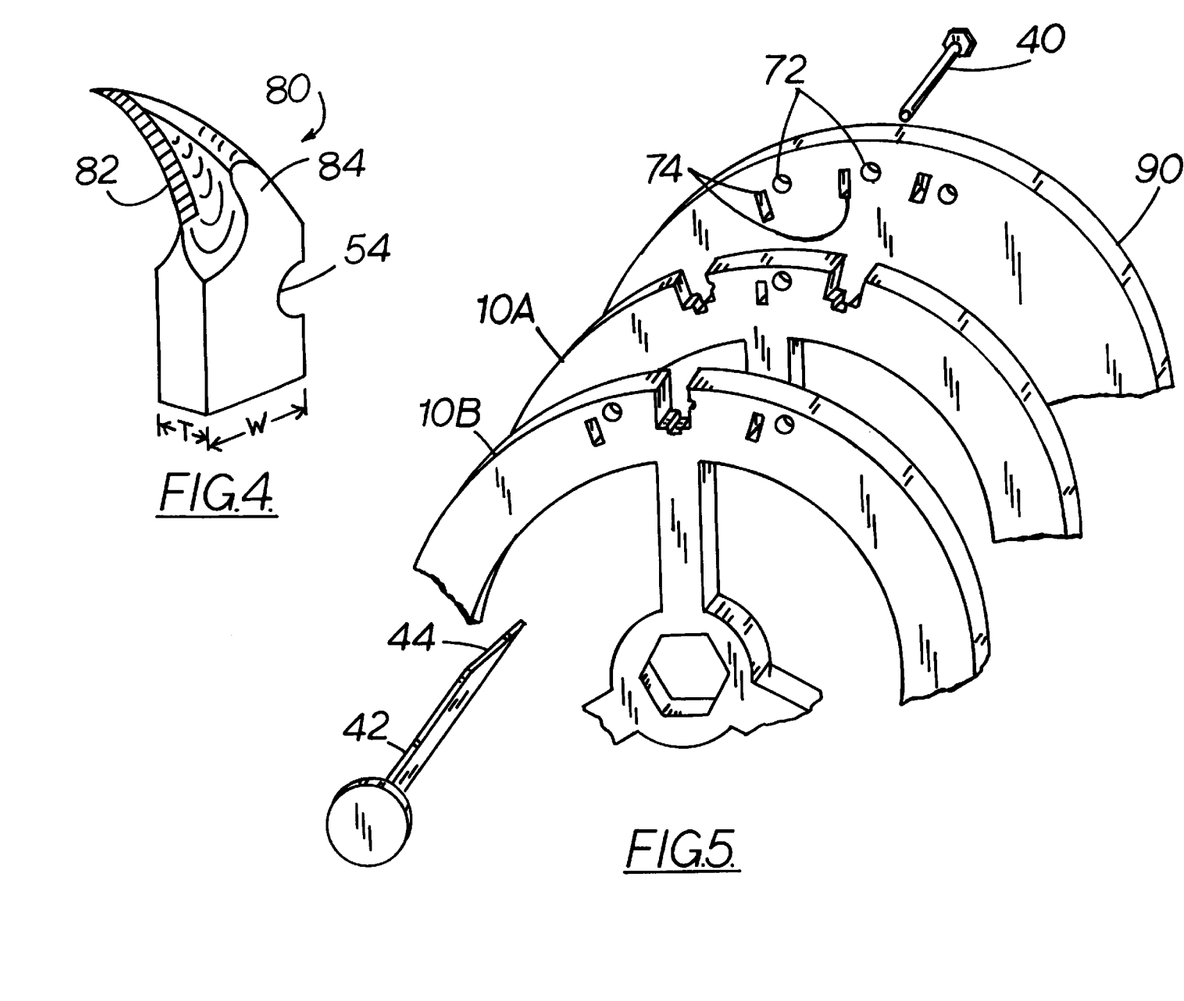
FIG. 4 is a perspective view of a claw with a carbide tip and cutting edge.
FIG. 5 is an exploded view, showing how an end plate and alternating A and B plates will allow passage of a locking shaft and a remover bar through an assembled claw drum.

A bottom-positioned remover notch 24 is positioned in each slot bottom wall 20c. As explained below and illustrated in FIG. 5, remover notch 24 (in conjunction with other slots described below) will allow a remover bar with a wedged tip to be tapped or hammered through a series of plates, to force loose any claws that have become jammed and stuck in their slots.

Each claw 50 has a base portion 52 (which fits snugly in a slot 20), and a protruding portion 60 which extends outwardly from plate 10 and slot 20. Each claw base 52 has a rectangular cross-section, with the same width as slot 20, and the same thickness as plate 10. Each claw base 52 also is provided with a locking notch 54, which will align with locking notch 22 of slot 20, when the claw 50 is properly seated in slot 20, to accommodate locking shaft 40.

Claw 50 includes a point 62, and a cutting edge 64 created by scalloped shapes 66 that have been forged, grinded, or otherwise provided in each claw. Preferably, scalloped shapes 66 should be provided on both sides of the cutting edge, and cutting edge 64 should be positioned in the exact centerline of the claw (when looked at along the plane of rotation). This will minimize any lateral bending forces that would be imposed on cutting edge 64 or point 62.

If desired, a claw 80 (shown in FIG. 4) can be provided with a tip and blade piece 82 which is made of carbide or some other extremely high-strength alloy. Carbide piece 82 can be soldered to a supporting claw structure 84 made of conventional high-strength steel, using a soldering alloy containing silver that is normally used to solder carbide tips to certain types of saw blades. The perspective view of claw 80 in FIG. 4 also indicates the width (W) and thickness (T) dimensions of the claw base.

Center hole 12 of plate 10 is designed to accommodate a driveshaft, so that rotation of the driveshaft will force the claw drum 122 (shown in FIG. 6) to rotate in the direction of claws 50 (as indicated in FIG. 3). In general, a powerful but potentially yielding system (such as a plurality of rubberized belts that are lined up next to each other, to drive a driveshaft pulley with multiple grooves) is preferable to gears, chains, or similar non-yielding drive system. If a claw drum becomes jammed and unable to move, the drive system (such as belts and pulleys) needs to be able to yield, so that permanent damage to any gears, chains, sprockets, etc., will be prevented or minimized.

Center hole 12 in plate 10 is shown with a hexagonal shape, to fit snugly on a hexagonal driveshaft. Since the number of slots in plate 10 is divisible by 6, and since the slots 20 are spaced in an equidistant and symmetric manner around the outer rim of plate 10, mounting such plates 10 on a hexagonal driveshaft will help ensure proper alignment of all plates on the shaft.

Alternately, center hole 12 could have a square cross-section, or any other suitable non-circular cross-section. It can also be circular if desired, if a keyway notch is provided that will align with a keyway notch in the driveshaft, so that a rectangular (or other suitably shaped) key can be inserted into the keyway notch, to prevent rotation of the plates relative to the driveshaft. This type of key system is illustrated by FIG. 3; however, it should be recognized that the shearing forces that would be imposed on a key in a small driveshaft would be several times higher than the shearing forces imposed on a key in an enlarged-drum type of driving mechanism. Accordingly, a key-type device is better suited for an enlarged drum with washer-type plates mounted on it, while a hexagonal or similar non-circular cross-section is better suited for small-diameter driveshafts. Because of the costs of fabricating certain components, driveshafts are likely to be preferable for claw drums less than about 60 cm (2 feet) long, while enlarged drums are likely to be preferable for claw drums more than about 90 cm (3 feet) long.

If a driveshaft is used, it does not need to have a single cross-sectional shape throughout its entire length. Instead, it can be provided with, for example, circular ends which flank a center hexagonal section where the plates will be mounted. This can help ensure that the plates do not try to migrate along the length of the driveshaft, when the claw drum is being used to shred carpet. Also, if desired, a driveshaft can be provided with a stop-washer, end plate, or other similar devices that have been welded, bolted, or otherwise securely attached to the driveshaft, to provide additional reinforcement against migration of the plates along the length of the driveshaft when the claw drum is in use.

The claw-holding plates 10 can be provided with spokes 14 that are separated by gaps, as shown in FIG. 1, or they can be made from solid steel, if desired, with no spokes. If laser cutting is used to generate spokes by removing material from between the spokes, it can also be used to fabricate additional pieces from the plate material that is removed from between the spokes, so long as the additional pieces have sufficiently small dimensions. Currently, that method is not preferred for creating claws, since claws generally should be forged, to give them maximum strength and durability. However, if carbide tips and cutting edges are welded to steel claws, or if operating experience indicates otherwise, the option of creating claws (or portions thereof) from steel plate material can be reevaluated if desired.

As another option, rather than mounting the claw-holding plates directly on a driveshaft, a different type of claw-holding plate 30 with no center portion (having the general shape of an enlarged flat washer) can be mounted on a rotating drum 32, as shown in FIG. 3. This would reduce the amount of high-quality steel that must be used to form the plates, especially if the unfinished plates (which have not yet been cut to provide slots or holes) can be forged or otherwise manufactured in the washer configuration with no center portion. It would also reduce the amount of laser cutting or other machining that is necessary to create finished plates. FIG. 3 also shows a driveshaft 34 which is welded or otherwise firmly affixed to drum 32, and a key 36, which is positioned in accommodating keyslots in drum 32 and in all of the plates 30 mounted on the drum. Key 36 will prevent rotation of the plates 30 relative to the drum 32.

As shown in FIGS. 1 and 2, plate 10 also contains a plurality of round locking bar holes 72 and rectangular remover bar holes 74, interspersed with the slots 20. The purpose of these holes can be seen by examining FIG. 5, which shows an end plate 90 and two slotted plates 10A and 10B. The two plates 10A and 10B must be designed and fabricated (e.g., by laser cutting) so that when they are mounted next to each other on a driveshaft or drum roller, the locking notches 22 in the slots of plate 10A will align with the round locking bar holes 72 of plate 10B, so that a single locking bar 40 can be inserted through all of the aligned claw-locking holes, and pass through the entire length of the claw drum. Locking bar 40 can be provided with threads at both ends, which can be used for two purposes. First, when a claw drum is being assembled, a threaded nut can be screwed tightly onto each threaded end of each locking bar. Since a plurality of locking bars will be used, spaced apart from each other and distributed evenly around the drum, this will firmly tighten all of the plates together, eliminating any gaps between them, and holding the claw drum securely together. Second, if a specific claw becomes damaged or worn and must be replaced, both of the nuts from the locking bar 40 which secures that claw in place can be removed, and a tension-bearing pulling device can be screwed onto the threads at either end of the locking bar. Using manual pulling force or a suitable tool such as a pulley remover, the tension-bearing pulling device that has been threaded onto the end of the locking bar 40 can be used to pull out the bar a sufficient distance to disengage it from the damaged claw, so the damaged claw can be replaced with a new claw.

Similarly, remover notches 24 of slots 20, in plate 10A, will align with rectangular remover bar holes 74 in plate 10B. This will allow a remover bar 42 (shown in FIG. 5) with a wedged end 44 to be hammered or otherwise forced through the aligned series of remover slots, if such force is necessary to remove a damaged claw that is stuck in its slot and cannot be removed by using pliers to grip protruding portion 60 of the damaged claw. The remover bar will dislodge each of the claws it encounters as it is hammered into the tunnel formed by the aligned remover slots. After it has dislodged the damaged claw which was stuck in its slot, the claw can be removed from the drum using a pair of pliers, and replaced with a new claw.

The design which uses two different alternating plates (plates 10A and 10B, in FIG. 5) can be used to provide alternating rows of claws, in which each row of claws effectively occupies the "gaps" in the preceding row. It is believed that this simple alternating row system provides a suitable design which will provide good results, in the form of properly shredded carpet material that can be separated into nylon and polypropylene at a relatively high purity level.

Claw Drum Dimensions and Operating Speeds

Several dimensions and operating variables need to be taken into account in designing and operating a carpet shredding and separating system as disclosed herein. Various dimensions and operating speeds are disclosed below. These are based on fabrication and early testing of a prototype system as disclosed herein, combined with operating experience in shredding various types of carpet, using open-cylinder claw drums as disclosed in the prior art. All metric dimensions are approximate; the components were designed and fabricated using English dimensions.

The claw-holding plates that have been designed and used to date have an external diameter of about 58 cm (23 inches). The claw slots are about 3.8 cm deep (1.5"), and the claw tips extend 3.8 cm (1.5") beyond the cylinder face, to provide a tip-to-tip drum diameter of 66 cm (26"). Each plate has 12 claw slots spaced equidistantly (every 30 degrees) around its periphery. Two different claw-holding plates having offset slot placements are used, as indicated by plates 10A and 10B in FIG. 5. This design provides 24 rows of teeth, spaced 15 degrees apart from each other, with alternating positioning of the claws in each row (i.e., if one row of claws occupies slots in the odd-numbered plates, then the claw rows before and behind that row will occupy slots in the even-numbered plates). All plates (including end plates) are made from high-carbon steel plate which is 1.27 cm (0.5") thick, except for "shim" plates, which are made of steel plate which is 1.58 mm (1/16") thick. Shim plates can be used to adjust the thickness of the aggregated claw plates when they are being mounted on a driveshaft or drum, to ensure a completely snug and secure fit when the end plates are mounted outside the claw plates.

All claws have a thickness of 1.27 cm (0.5"), to match the thickness of the claw-holding plates. The width of each claw-holding slot is 3.178 cm (1.25"). The width of each claw base is smaller, by about 0.005 to about 0.010 thousandths of an inch, to allow a claw to be inserted snugly all the way into the slot.

During use, the rotation speed of the claw drum and the "infeed" speed of the carpet should be adjusted relative to each other, so that a row of claws will tear into the carpet each time the carpet has been moved forward about 0.4 to about 0.8 mm (1/64" to 1/32"). This can be accomplished by, for example, rotating the drum at about 600 to 800 rpm while the carpet is fed into the shredding system at about 6 to 9 meters (20 to 30 feet) per minute. These rotation and infeed speeds can be adjusted, if desired, to allow two or more layers of carpet to be fed through the shredder at a time.

A carpet segment must be fed into the shredder using a conveyor system that securely grips the carpet, to prevent it from being yanked into the shredder as it is being ripped apart. Discarded carpets can be pre-cut into strips that are narrow enough to be fed into a conveyor system having a claw drum with a width in the range of about 60 to 120 cm (24 to 48"). This type of cutting into strips is substantially cheaper and easier to use than current systems, which typically use two different chopping machines and a complex conveyor system, to cut carpet segments into squares that are about 7 to 10 cm (3 to 4") on each side.

The shredding system should be equipped with either or both of two control devices: a drum speed gauge, to monitor the rotating speed of the drum, or an electrical load gauge, which measures amperage or watts, to monitor how much electricity is being used by the motors that are driving the claw drum. If either of these controls indicates that the claw drum is struggling to deal with a specific piece of carpet that is being fed into the machine, an electronic signal generated by the monitoring device can be used to automatically slow down the carpet conveyor system, so that the carpet will be fed into the shredder at a slower speed. This type of system is generally cheaper and more durable than using variable speed motors (which are relatively expensive) to vary the rotating speed of a claw drum.

As noted above, it is believed that these combined dimensions and operating parameters can provide good results on most types of carpet that are suitable for recycling. It should be recognized that any of these dimensions or speeds can be altered somewhat, if desired, provided that other dimensions or speeds are adjusted in an accommodating manner, if necessary to provide good operating results.

It should be recognized that carpets fall into two very different categories, in terms of how they perform in recycling operations. Those two categories are (1) cut-pile carpets, in which the nylon fibers in the pile material are cut into relatively short lengths (usually about 4 cm (1.5 inch) or less), and (2) continuous loop carpets, in which long strands of nylon are used to make numerous pile loops.

Figure 6:
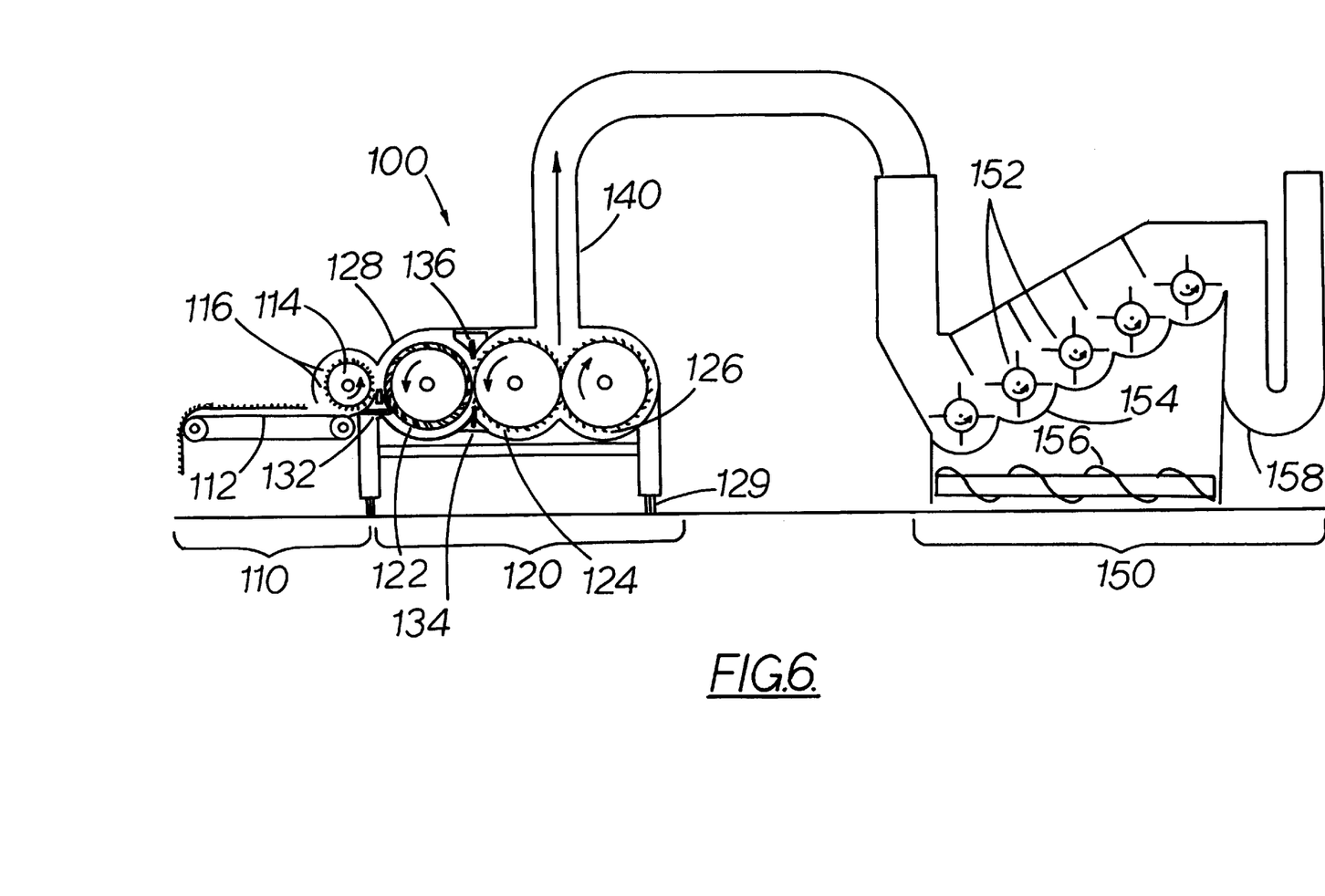
FIG. 6 is a cutaway side view which depicts a claw drum as one component of a three-cylinder shredder.

Cut-pile carpet is much easier to recycle in a manner that separates the nylon from the polypropylene, for at least two reasons: (1) a substantial amount of the polypropylene from the carpet backing layers will emerge from a shredding operation in the form of relatively long strands, which are fairly easy to separate from short fragments by means of a step cleaner device 150 as shown in FIG. 6; and (2) because polypropylene is substantially more dense than nylon fibers from carpet piles, it is moderately easy to separate polypropylene fragments from nylon fragments, so long as both sets of fragments are relatively short and do not actively entwine with and entangle each other.

By contrast, when continuous-loop carpet is recycled, long nylon strands and long polypropylene strands will be generated, and will become entwined and entangled with each other. It is effectively impossible to separate them, using high-volume automated equipment.

This does not mean that continuous-loop carpet cannot be recycled; it means, however, that the mixed nylon and polypropylene material that can be recovered from continuous-loop carpet should be used for purposes that do not require a high level of separation of the two different components. By contrast, the relatively pure nylon material that can be recovered from cut-pile carpet can be used for other purposes which have higher per-unit values.

Angled, Slanted, and V-shaped Rows of Claws

Various other claw placement arrangements are currently being evaluated, including claw rows that have various types of slants. One example involves V-shaped claw rows, in which a mild angle is imparted to the claw rows (or possibly to every other claw row), so that the claws in the middle of the drum will contact the carpet and begin tearing it in the middle, before the flanking claws contact the carpet.

Angled rows can be provided by any of several means. As one example, a heavy-duty set screw can be used to lock each claw in place. This would eliminate the need to line up locking notches in the plates.

Alternately, claw slots and claws can be provided which have varying widths. For example, claws mounted in a center plate can be provided with a base that is 4 cm wide, while claws in the outermost plates can be provided with a base that is only 3 cm wide. The trailing edges of the slots in all of the plates would be aligned in linear rows, so that the locking notches of all of the plates will line up and allow locking bars to be inserted through an assembled claw drum. The wider base of the center claws would cause the points and cutting edges of the center claws to be positioned 1 cm ahead of the points and cutting edges of the outermost claws. The claw slots in the intermediate plates (i.e., the plates that are positioned between the center plate(s) and the outermost plates) can be graduated in width, to provide an angled but linear row of claw points on each side of the center claws. This would provide claw rows that have a mild V-type shape.

This arrangement would require various different sized-plates and claws to be used to create a single claw drum. However, if the plates are fabricated by computer-controlled laser cutting machinery, it is relatively simple and inexpensive to program the laser machinery to cut slots of any desired size, in any number of plates, and then etch an identifying number on the side of each plate, so that an assembler will know what position that plate should be placed in, as a claw drum is being assembled. It would also require claws of different sizes to be manufactured and stockpiled; however, since a relatively large number of claws will be manufactured in any manufacturing run, the additional expense per claw will not be extremely high.

As noted above, the current drum design, with alternating non-slanted rows of claws, is believed to be adequate for the purposes disclosed herein, and it is the simplest, easiest, least expensive system to assemble and use. Different drum or claw designs, with slanted or V-shaped claw rows, can be manufactured and tested, if operating results indicate that further improvements are needed beyond the levels provided by the current drum design.

Three-Cylinder Shredding Machine

The claw drum disclosed herein can be used in various different types of processing systems, including (1) shredding and separation systems for recycling discarded carpet; (2) shredding of fiberglass; and (3) shredding of synthetic textiles for re-use of their polymer contents. Obviously, the various pieces of equipment that will surround and support the claw drum will vary, depending on what type of material is being shredded and how it is subsequently processed.

FIG. 6 depicts a system 100 for shredding and separating discarded carpets. This system includes a carpet feed system 110, a three-cylinder shredding machine 120 which includes a claw drum 122 as disclosed herein, a transfer duct 140, and a step cleaner system 150. The carpet feed system 110, transfer duct 140, and step cleaner system 150 are all known and conventional devices.

Three-cylinder shredding machines were originally developed in the early 1900's, for use in preparing sheep's wool (including a combing step to remove rocks, twigs, dirt, etc.) so the wool could be woven into woolen fabrics. However, three-cylinder machines did not perform well in that use; apparently, they were too rough on wool that was being processed, the combing operation did not perform satisfactorily, and the guarding system was inadequate. For these and possibly other reasons, their manufacture and use was discontinued, and the wool and textile industries developed and used two-cylinder and one-cylinder systems instead. To the best of the Inventors' knowledge, there was no known use for old three-cylinder combing or shredding machines, until the recent discovery that they could be modified (by inserting heavy-duty claw drums into them) so that they would work effectively as carpet shredders.

The carpet feed system 110 includes a conveyor belt 112, and a feed roller 114 which has numerous protruding spikes 116 which are roughly comparable to the protrusions on a bicycle chain sprocket. These spikes 116 cover the entire length of feed roller 114. This feed roller 114 must be able to exert firm, solid, and reliable control over the transport of a carpet segment entering the shredding device, to allow the carpet to be ripped apart in a steady progression without being yanked into the shredding machine.

If desired, carpet feed system 110 or shredding machine 120 can provide a set of spray nozzles to spray water onto the carpet segments that pass through the system, to reduce the amount of static electricity generated inside the shredding machine.

The shredding machine 120 shown in FIG. 6 contains claw drum 122 as disclosed herein, and two rollers 124 and 126 which are covered, across their entire surface area, with serrated surfaces that resemble the cutting edges of sawblades, with teeth roughly 3 mm (⅛") tall. The claw drum 122, rollers 124 and 126, and feed roller 114 are surrounded by an enclosure hood 128, which can be made of sheet metal, fiberglass, graphite, or any other suitable material having suitable strength. This enclosure hood 128 can be positioned at a suitable height using legs 129, and it can be provided with access doors on the bottom, to allow removal of dirt and particulates. The enclosure hood preferably should have curved edges that generally conform to the shapes of the various rollers, to avoid creating square corners that would become "dead spots" where shredded or semi-shredded material would accumulate.

Enclosure hood 128 also encloses three devices called "breaker bars", shown by callout numbers 132, 134, and 136. Each breaker bar contains a serrated blade made of carbide or an extremely hard and durable alloy, held in a fixed position by a strong mounting bracket. The breaker bars help rip apart material that is being shredded, and they also help prevent shredded material from accumulating in the claws of claw drum 122 or on the serrated surfaces of rollers 124 and 126.

Carpet feed roller 114 forces a carpet segment up the inclined slope of breaker bar 132, leading it across the serrated top edge of the breaker bar and directly into the path of the descending teeth of the claw drum 122. This arrangement forces the leading edge of the carpet segment to be bent sharply downward, and helps promote the initial clawing and tearing step.

The direction of rotation of each roller is shown in FIG. 6. In one preferred operating mode, claw drum 122 and roller 124 each rotate at roughly 800 rpm, while roller 126 rotates at a somewhat slower speed, such as about 600 rpm. This difference in rotating speed helps disengage the shredded material from the serrated surface of roller 124, so it can be pulled away from the rollers and sucked by a vacuum into transfer duct 140.

Transfer duct 140 carries the shredded material to a step cleaner machine 150. Such machines are sold by companies such as Hollingsworth, Inc. (Greenville, S.C.), Centrif-Air Machine Company, Inc. (Suwanee, Ga.), and Laroche Machines (Cours, France). Briefly, in this type of machine, a series of rotating stirrers 152 push shredded material against a heavy-duty perforated screen 154, which is created by punching holes through sheet metal, then subsequently bending the perforated sheet metal into an appropriate shape. Particulates and short fibers (including nylon fibers from cut-pile carpet) will drop through the perforated screen 154, where they are collected, or conveyed elsewhere by an auger drive 156 or other suitable device.

If any long strands survive the shredding operation (this can be achieved, if desired, for some types of carpet, by adjusting the spacing, rotating speed, and other operating parameters of the claw drum and rollers inside the shredding machine 120), those long strands will not drop through the perforated screen 154. Instead, they will be pulled across perforated screen 154 by stirrers 152, and removed by a vacuum system 158 or other suitable means.

Economic Factors and Nylon Purity Levels

In general, nylon is substantially more valuable than polypropylene, and the purity of the nylon output will be a principle factor which determines the economic viability of any carpet recycling operation. If reclaimed nylon contains less than about 5% polypropylene by weight, the value of that nylon output will be relatively high, and it can support the costs of the recycling operation. Higher polypropylene levels gradually decrease the value of the nylon output, and any improvement in a carpet shredding and separating operation which can increase the purity of the nylon output will increase the value of that output.

Accordingly, the primary goals of this operation are: (1) to provide a heavy-duty shredding and separating system in which worn or damaged claws can be quickly and easily repaired with minimal "down time"; (2) to provide a shredding and separating system that provides an economic balance of high nylon purity and low operating cost; and (3) to provide a shredding and separating system that can be used to process and reclaim materials from a variety of different carpet types.

In general, a shredding and separating system that can provide greater than about 80% nylon purity in the output material, without requiring expensive processing steps to separate the nylon from the polypropylene in order to reach that level of purity, should generally be regarded as successful or at least promising. If a shredding and separating system can pass the 90% nylon purity level, that is a highly valuable improvement; if it can pass the 95% nylon purity level, it becomes even more valuable. It is believed that, when cut-pile carpet is processed in the system, the shredding and separating system disclosed herein can surpass the 80% purity level by a comfortable margin in normal operation, and that it may be able to approach or surpass the 90% level and possibly even the 95% level, during normal operation.

It should also be noted that the claw drums disclosed herein can also be used to shred fiberglass, discarded clothing and other textiles, and similar materials.

Thus, there has been shown and described a new type of improved claw drum for shredding carpet and certain other materials. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

We claim:

1. A claw drum assembly for shredding materials, comprising:
   (a) a plurality of flat plates, each plate having a circular outer rim with a plurality of claw-holding slots spaced apart from each other around the rim, and having a center orifice for mounting the plate on a rotatable drive mechanism;
   (b) a plurality of claws, each claw having a base portion which fits in a claw-holding slot in a flat plate of part (a), and a protruding claw portion with an outer tip and a cutting edge; and,
   (c) claw-locking devices which firmly secure the claws in the slots when the claw drum assembly is in use, and which also allow a single damaged claw to be removed from the claw drum assembly without requiring removal of any other claws from the claw drum assembly,
   wherein the flat plates, claws, and claw-locking devices have been securely affixed to each other in a manner which forms a cylindrical assembly having protruding claw portions which are spaced apart from each other, and wherein the claw drum assembly:
   (1) provides an impermeable cylindrical face between the protruding claw portions, which substantially prevents particulates generated during a shredding operation from permeating into the claw drum assembly;
   (2) is fabricated of sufficiently strong and durable components for prolonged use in a highly abrasive shredding operation; and,
   (3) is suitable for shredding a discarded material selected from the group consisting of carpets, fiberglass, and synthetic textiles.

2. The claw drum assembly of claim 1, wherein each slot is provided with a locking notch positioned in a wall of the slot, and wherein each claw is provided with a locking notch in the base portion of the claw, wherein proper placement of a claw in a slot causes the locking notch of the claw to align with the locking notch of the slot, thereby forming an orifice through which a locking bar can be passed, wherein the locking bar will prevent removal of the claw from its slot until after the locking bar has been removed from the orifice.

3. The claw drum assembly of claim 2, wherein all claws are arranged in rows of claws, and wherein all claw-holding slots and claws in the claw drum assembly are provided with locking notches, and wherein all plates and all locking notches in the claw drum assembly are positioned in a manner that allows a plurality of locking bars to be passed through all plates of the claw drum assembly, thereby locking all claws in place in the claw drum assembly, wherein each locking bar prevents removal of any claw in a row of claws engaged by that locking bar, until the locking bar has been removed from the locking notch in that claw.

4. The claw drum assembly of claim 1, which has been assembled by firmly securing the flat plates upon a rotatable drive mechanism selected from the group consisting of a driveshaft and a roller drum, to form a cylindrical assembly with protruding claws.

5. The claw drum assembly of claim 4, wherein the plates are secured to each other by a plurality of locking bars, wherein each locking bar passes through all flat plates in the claw drum assembly.

6. The claw drum assembly of claim 1, wherein the plates are secured to each other by a plurality of locking bars, wherein each locking bar passes through all assembled flat plates in the claw drum assembly, thereby forming a cylindrical assembly with protruding claw portions and with an orifice passing through its center, wherein the cylindrical assembly is designed to be mounted upon a rotatable drive mechanism.

7. The claw drum assembly of claim 1, wherein each claw-holding slot is provided with a remover bar notch, and wherein each remover bar notch is aligned with remover bar notches in other plates in a manner that allows a straight remover bar with a wedged end to be forced into an aligned row of remover bar notches, thereby dislodging the base portions of any claws that are contacted by the remover bar.

8. The claw drum assembly of claim 1, wherein the claws comprise carbide tips and cutting edges that have been securely attached to steel support structures.

9. A rotatable shredding device comprising:
   (a) a plurality of flat plates with cylindrical outer rims, which are mounted adjacent to each other and pressed against each other on a rotatable drive mechanism in a manner which forms a rotatable cylindrical assembly, wherein each flat plate has at least one claw-holding slot that is designed for holding in a secure and lockable manner a base of an insertable claw component;
   (b) a plurality of insertable claw components, wherein each claw component has a base portion which fits snugly into a claw-holding slot of a flat plate of part (a), and a protruding portion having a tip and a cutting edge which extend outwardly from the rotatable cylindrical assembly when the base portion is secured in a claw-holding slot;
   (c) means for (1) securing and locking each claw base in a claw-holding slot, so that all claw bases remain locked in position while the shredding device is rotating during a shredding operation, and (2) releasing a single damaged claw component from the shredding device, after the unit has been stopped and is not rotating, so that the damaged claw can be removed and replaced by a new claw component, without requiring removal of any other claw components from the shredding device,
   wherein the flat plates and protruding claws in the shredding device provide an impermeable exterior surface which prevents particulates from entering the shredding device, and wherein the shredding device is designed and fabricated for use in abrasive shredding operations.

10. The rotatable shredding device of claim 9, wherein the claws are arranged in rows, and wherein all claw-holding slots and claws in the shredding device are provided with locking notches, and wherein all plates and all locking notches in the shredding device are positioned in a manner that allows a plurality of locking bars to be passed through all plates of the shredding device, thereby locking all claws in place in the shredding device, wherein each locking bar prevents removal of any claw in a row of claws until the locking bar has been removed from the locking notch in that claw.

11. The rotatable shredding device of claim 9, which has been assembled by firmly securing the flat plates upon a rotatable drive mechanism selected from the group consisting of a driveshaft and a roller drum, to form a cylindrical assembly with protruding claws.

12. The rotatable shredding device of claim 9, wherein the claws comprise carbide tips and cutting edges that have been securely attached to steel support structures.

13. A three-cylinder shredding machine for shredding carpet, comprising a rotatable claw drum, two additional rollers having serrated surfaces, an enclosure hood which encloses all three cylinders, an inlet door which allows segments of carpet to be fed into the shredding machine, and an outlet opening which allows shredded material to be removed from the shredding machine.

14. The three-cylinder shredding machine of claim 13, wherein the claw drum comprises:

(a) a plurality of flat plates with cylindrical outer rims, which are mounted adjacent to each other and pressed against each other on a rotatable drive mechanism in a manner which forms a rotatable cylindrical assembly, wherein each flat plate has at least one claw-holding slot that is designed for holding in a secure and lockable manner a base of an insertable claw component;

(b) a plurality of insertable claw components, wherein each claw component has a base portion which fits snugly into a claw-holding slot of a flat plate of part (a), and a protruding portion having a tip and a cutting edge which extend outwardly from the rotatable cylindrical assembly when the base portion is secured in a claw-holding slot;

(c) means for (1) securing and locking each claw base in a claw-holding slot, so that all claw bases remain locked in position while the shredding machine is being operated, and (2) releasing a single damaged claw component from the shredding machine after it has been stopped and is not operating, so that the damaged claw can be removed and replaced by a new claw component, without requiring removal of any other claw components from the shredding device, wherein the flat plates and protruding claws in the claw drum provide an impermeable exterior surface which prevents particulates from entering the claw drum.

15. The three-cylinder shredding machine of claim 14, wherein all claws on the claw drum are arranged in rows, and wherein all claw-holding slots and claws in the claw drum are provided with locking notches, and wherein all flat plates and all locking notches in the claw drum assembly are positioned in a manner that allows a plurality of locking bars to be passed through all plates of the claw drum, thereby locking all claws in place in the claw drum assembly during operation of the shredding machine, wherein each locking bar prevents removal of any claw in a row of claws engaged by that locking bar, until the locking bar has been removed from the locking notch in that claw.

16. The three-cylinder shredding machine of claim 14, wherein the claws comprise carbide tips and cutting edges that have been securely attached to steel support structures.

* * * * *